United States Patent

Miyauchi et al.

[11] Patent Number: 5,371,510
[45] Date of Patent: Dec. 6, 1994

[54] AUTOMOTIVE INFORMATION DISPLAY APPARATUS

[75] Inventors: Kunihiro Miyauchi, Okazaki; Masaji Aono, Nagoya; Motoharu Esaki, Oobu; Norio Fujimori, Tokai; Tetsuya Kobayashi, Oogaki, all of Japan

[73] Assignee: Nippondenso Co., Ltd., Kariya, Japan

[21] Appl. No.: 798,178

[22] Filed: Nov. 26, 1991

[30] Foreign Application Priority Data

| Nov. 28, 1990 [JP] | Japan | 2-332023 |
| Jan. 25, 1991 [JP] | Japan | 3-007858 |
| Apr. 11, 1991 [JP] | Japan | 3-108621 |

[51] Int. Cl.$^5$ .................................................. G09G 1/28
[52] U.S. Cl. .......................................... 345/7; 345/9; 359/13; 359/630
[58] Field of Search ............ 340/705, 980; 359/13, 359/630, 632; 345/7, 9, 8

[56] References Cited

U.S. PATENT DOCUMENTS

| 4,594,572 | 6/1986 | Haubner et al. | 340/715 |
| 4,636,782 | 1/1987 | Nakamura et al. | 340/705 |
| 4,831,366 | 5/1989 | Iino | 340/980 |
| 4,973,942 | 11/1990 | Iino | 340/980 |
| 5,121,099 | 1/1992 | Hegg et al. | 340/205 |

FOREIGN PATENT DOCUMENTS

| 3732144A | 6/1989 | Germany . | |
| 54-13365 | 1/1977 | Japan . | |
| 53-115049 | 2/1977 | Japan . | |
| 59-176767 | 10/1984 | Japan . | |
| 61-211139 | 9/1986 | Japan | 340/705 |
| 62-23015 | 1/1987 | Japan | 340/705 |
| 64-52533 | 2/1989 | Japan . | |
| 64-56239 | 3/1989 | Japan . | |

OTHER PUBLICATIONS

SAE "Automotive Electronic Displays and Information Systems"–Feb. 23–27, 1987, pp. 27–33.

*Primary Examiner*—Ulysses Weldon
*Assistant Examiner*—Amare Mengista
*Attorney, Agent, or Firm*—Cushman, Darby & Cushman

[57] ABSTRACT

An automotive display apparatus displays synthetically an ordinary information like a vehicle speed value and a warning information like a remaining fuel amount by using a half mirror as a close range view and a distant range view. A control means determines contents of the ordinary information and the warning information on the basis of input signals from a plurality of sensors. When the warning information is displayed, the warning information is provided at a position that the warning information overlaps with the ordinary information in the line direction of a driver's sight and the warning information is away from the ordinary information by a predetermined distance to enable the driver to notice and observe the warning information easily. At the same time, the ordinary information at the overlap portion of the ordinary and warning information in the line direction of the driver's sight is inhibited from being displayed.

13 Claims, 11 Drawing Sheets

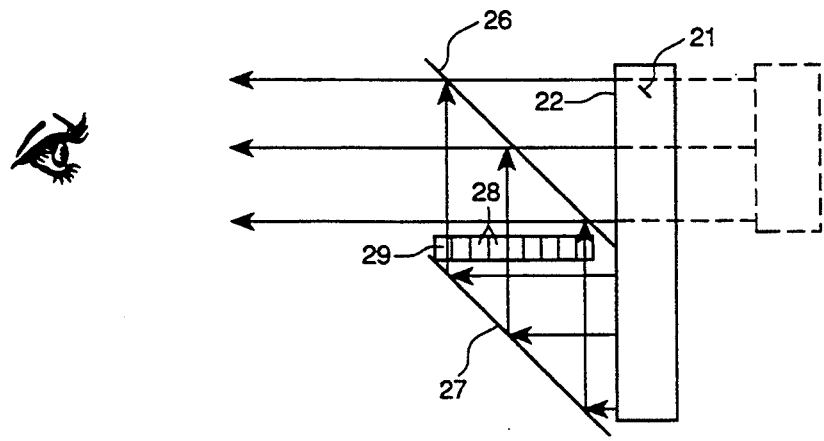
Fig. 6
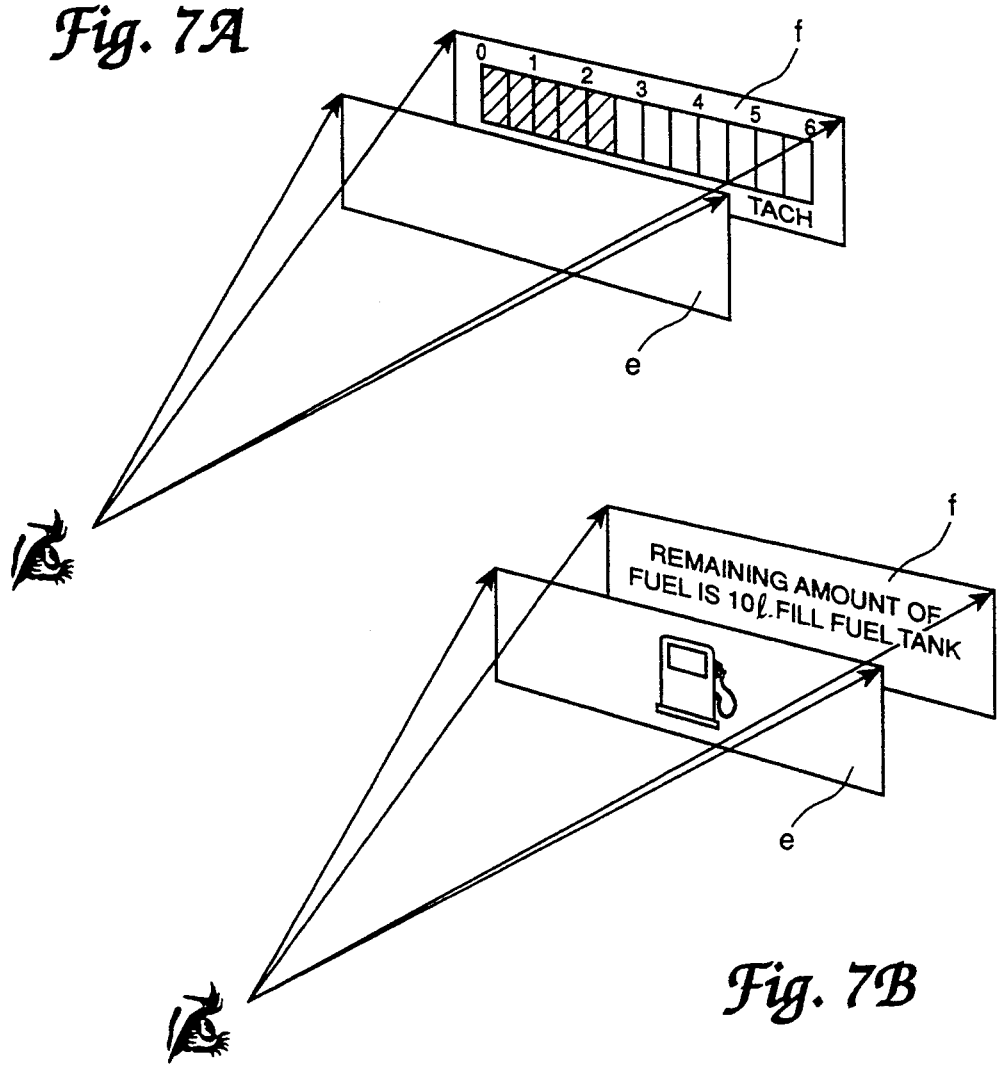
Fig. 7A
Fig. 7B

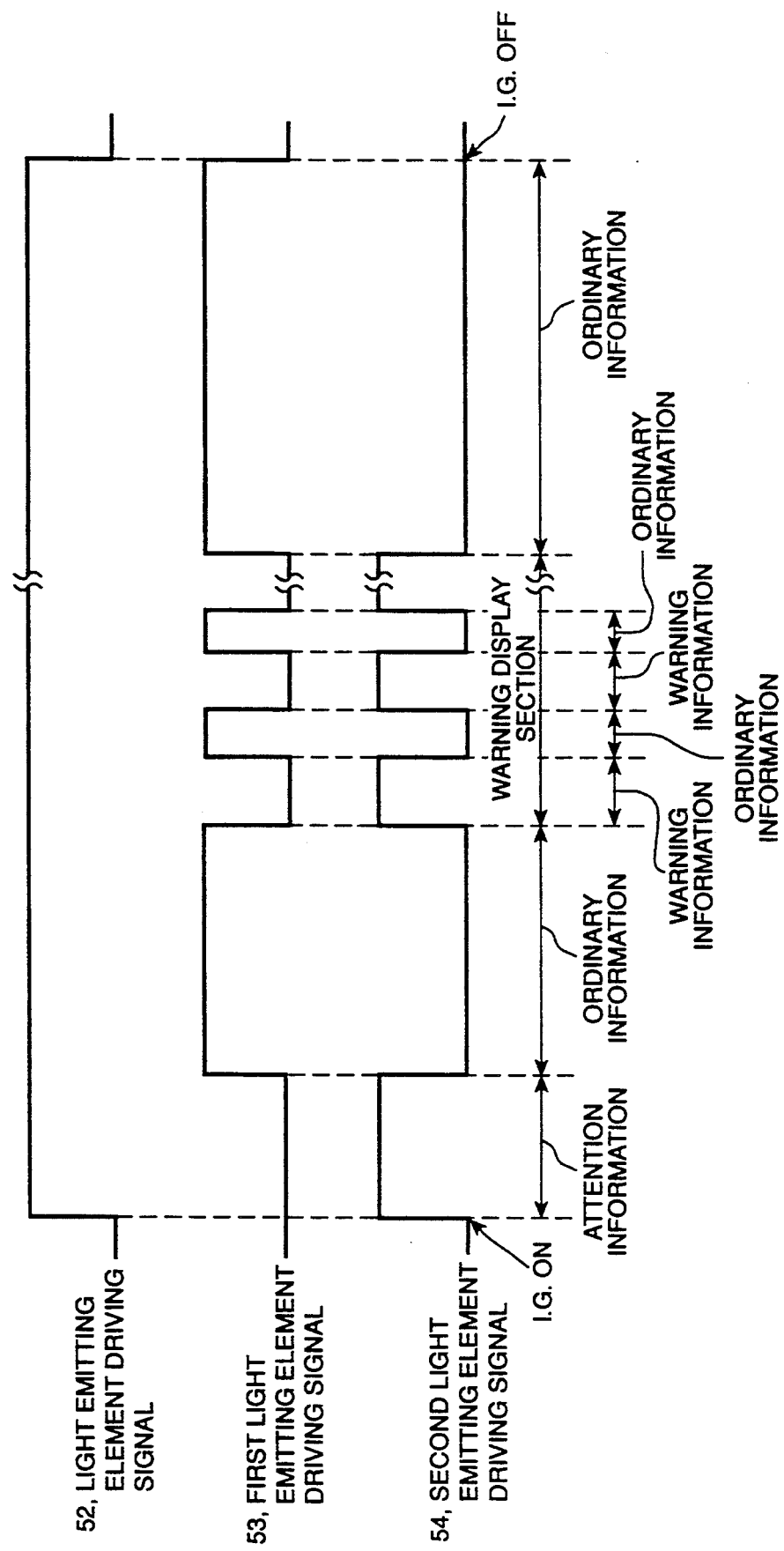

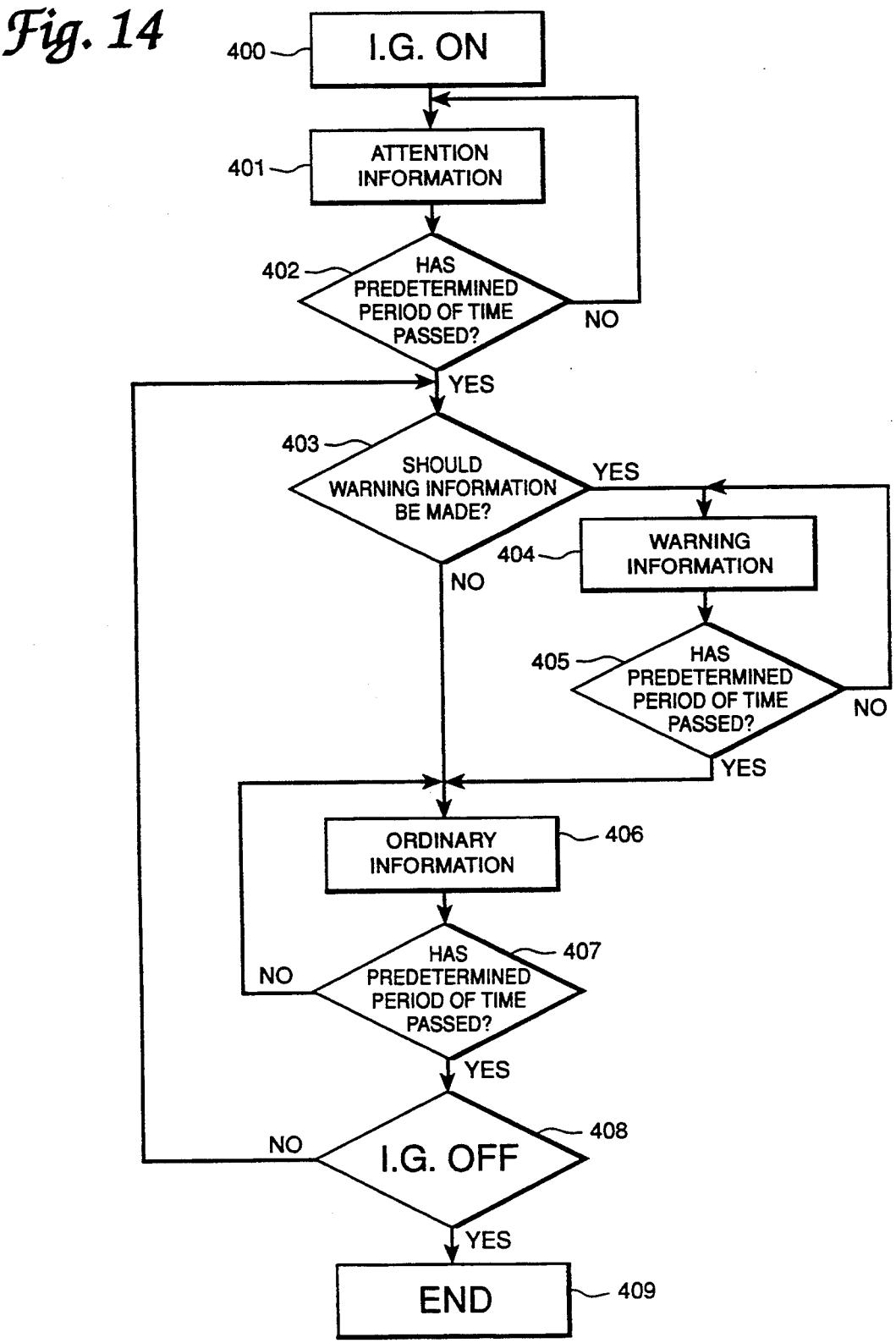

AUTOMOTIVE INFORMATION DISPLAY APPARATUS

BACKGROUND OF THE INVENTION

1. Field of the Invention

The present invention relates to an automotive information display apparatus which enables a driver to observe information easily by displaying the information as a close-range view and a distant view.

2. Brief Description of the Related Arts

In a conventional automotive information display apparatus assembled into an instrumental panel, various information such as vehicle speed, engine rotational speed, remaining amount of fuel, temperature of cooling water, travel distance and so forth are typically displayed. Moreover, the warning information such that a remaining amount of fuel is reduced to a low level and the temperature of engine cooling water increases to a abnormal high level and so forth are displayed. The warning information display is switched on and off and the warning information color is varied so that the driver can notice warning conditions.

As an another construction of the display apparatus like this, a display apparatus is proposed, which apparatus has a half mirror, a first display disposed behind the half mirror and a second display disposed above the half mirror and with an displaying face thereof directed to the half mirror. The display apparatus displays synthetically display contents of both the first and second displays. When the display information of the first display is an ordinary information, for example, the vehicle speed by using a pointer and the display information of the second display is the warning information by using a liquid crystal display, the vehicle speed displayed at the first display is observed visually as a real image through the half mirror and the information displayed at the second display is observed as a virtual image on the half mirror.

The former information display apparatus, however, has a disadvantage such that a distinction between one information and the other information is difficult and a recognition of the information is insufficient for a driver in the case that many kinds of information are displayed because display positions of the information are on the same plane.

In the latter information display apparatus, moreover, a display formation is not varied as a whole even when there is a difference of the display contents between for example travel distance which are ordinary information and refueling information which is important warning information. The display content of the second display will simply change from travel distance to refueling information when the vehicle speed displayed by the pointer of the first display and the travel distance displayed by the second display were being displayed. Accordingly, the information display apparatus has a disadvantage that even when the display content of the second display changes from ordinary running information to warning information that is important information for the driver, it is still difficult for the driver to distinguish visually a difference of a degree of importance between the information. Therefore, the display apparatus cannot sufficiently display the warning information.

SUMMARY OF THE INVENTION

The present invention has an object to provide an information display apparatus which, when the information is changed from an ordinary information to a warning information, emphasizes the warning information so that a driver can notice easily the warning information and visibility can be improved.

An another object of the present invention is to enable for the driver to observe easily the ordinary information by making a display condition having depth.

In the present invention, a reflecting and transmitting means is employed for forming a close-range view and distant view. When the warning information is displayed, the warning information is provided at a position that the warning information overlaps with the ordinary information in the line direction of the driver's sight and the warning information is away from the ordinary information by a predetermined distance. At the same time, the ordinary information at a overlap portion of the ordinary and warning information in the line direction of the driver's sight is inhibited from being displayed.

BRIEF DESCRIPTION OF THE DRAWINGS

FIG. 6 is a side view of an essential portion of an information display apparatus showing a second embodiment of the present invention, FIG. 7A is a perspective side view showing an example of a warning information displayed at the display apparatus in FIG. 6, FIG. 7B is a perspective side view showing an example of an ordinary information displayed at the display apparatus in FIG. 6, FIG. 13 is a waveform diagram showing an output signal of a control circuit in FIG. 9, FIG. 14 is a flow chart showing an processing executed by the control circuit in FIG. 9.

DETAILED DESCRIPTION OF THE EMBODIMENTS

Embodiments of the present invention will be described with reference to the accompanying drawings.

Figure 1:
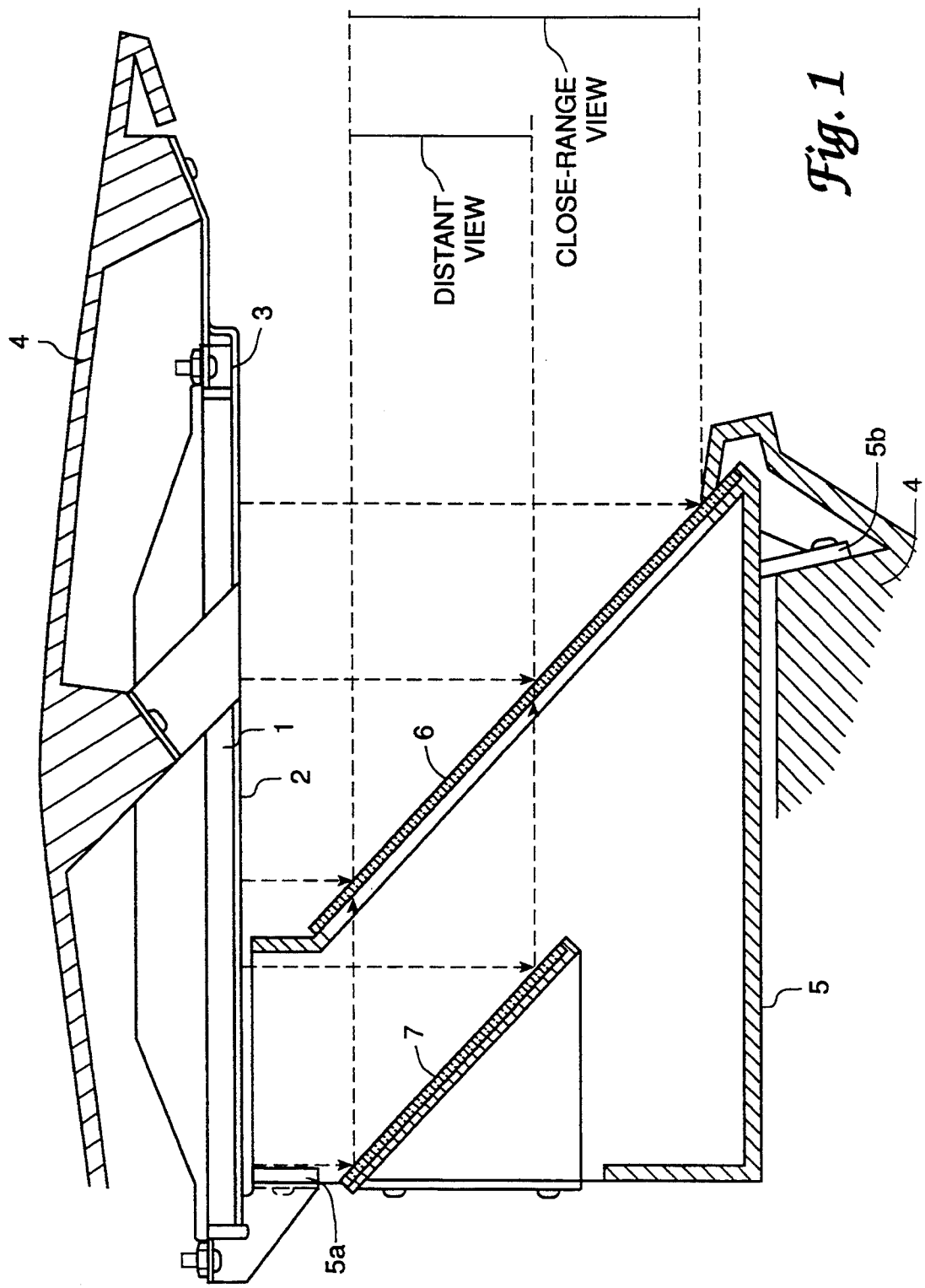
FIG. 1 is a sectional view of a automotive information display apparatus showing a first embodiment of the present invention.

FIG. 1 is a sectional view of an automotive information display apparatus in which a display apparatus according to a first embodiment of the present invention is incorporated. Dot matrix display unit 1 includes a display means of the present invention, and the dot matrix display unit 1 is disposed with an information displaying face 2 thereof directed downwardly and secured to an instrument cluster 4 by a bracket 3. Mirror case 5 is secured by fastening an upper portion 5a and a lower portion 5b thereof to the instrument cluster 4 by screws. A half mirror 6 is mounted on the forward side of the mirror case 5 as viewed from the driver's side while a total reflection mirror 7 is mounted behind the half mirror 6. The half mirror 6 and the total reflection mirror 7 are both disposed below the information displaying face 2 of the dot matrix display unit 1 such that reflecting faces thereof are inclined at 45 degrees. The half mirror 6 has a function of reflecting about 50 percent of incidence light and transmitting about 50 percent of such incidence light therethrough. Consequently, a driver can observe, through the half mirror 6, displayed information of the dot matrix display unit 1 reflected by the total reflection mirror 7. Due to an optical path difference, information reflected by the total reflection mirror 7 is displayed as a distant view while information reflected by the half mirror 6 is displayed as a close-range view. The half mirror 6 and the total reflection mirror 7 serve as a reflecting and transmitting means of the present invention.

Figure 2:
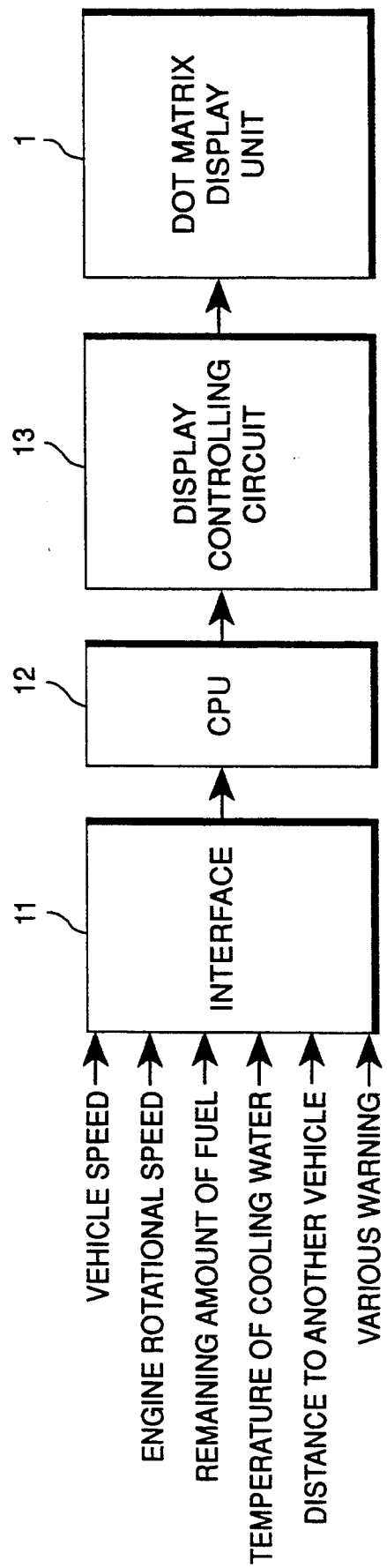
FIG. 2 is a block diagram showing an arrangement of a drive circuit of the above embodiment.

FIG. 2 is a block diagram showing an outline of a driving circuit of the automotive information display apparatus described above. The vehicle includes various sensors for detecting a vehicle speed, an engine rotational speed, a remaining amount of fuel, a temperature of cooling water, a distance to another vehicle and so forth, and various warning signals are inputted to a microcomputer (hereinafter referred to as CPU) 12 by way of various interfaces 11 shown generically as interface block 11. The CPU 12 includes a RAM and a ROM not shown, and executes processing in accordance with a predetermined control program and forwards display data and display control data based on the aforementioned signals to a display controlling circuit 13. The display controlling circuit 13 displays predetermined information at a predetermined position of the information display face 2 of the dot matrix display unit 1 based on such display data and display control data.

Figure 3:
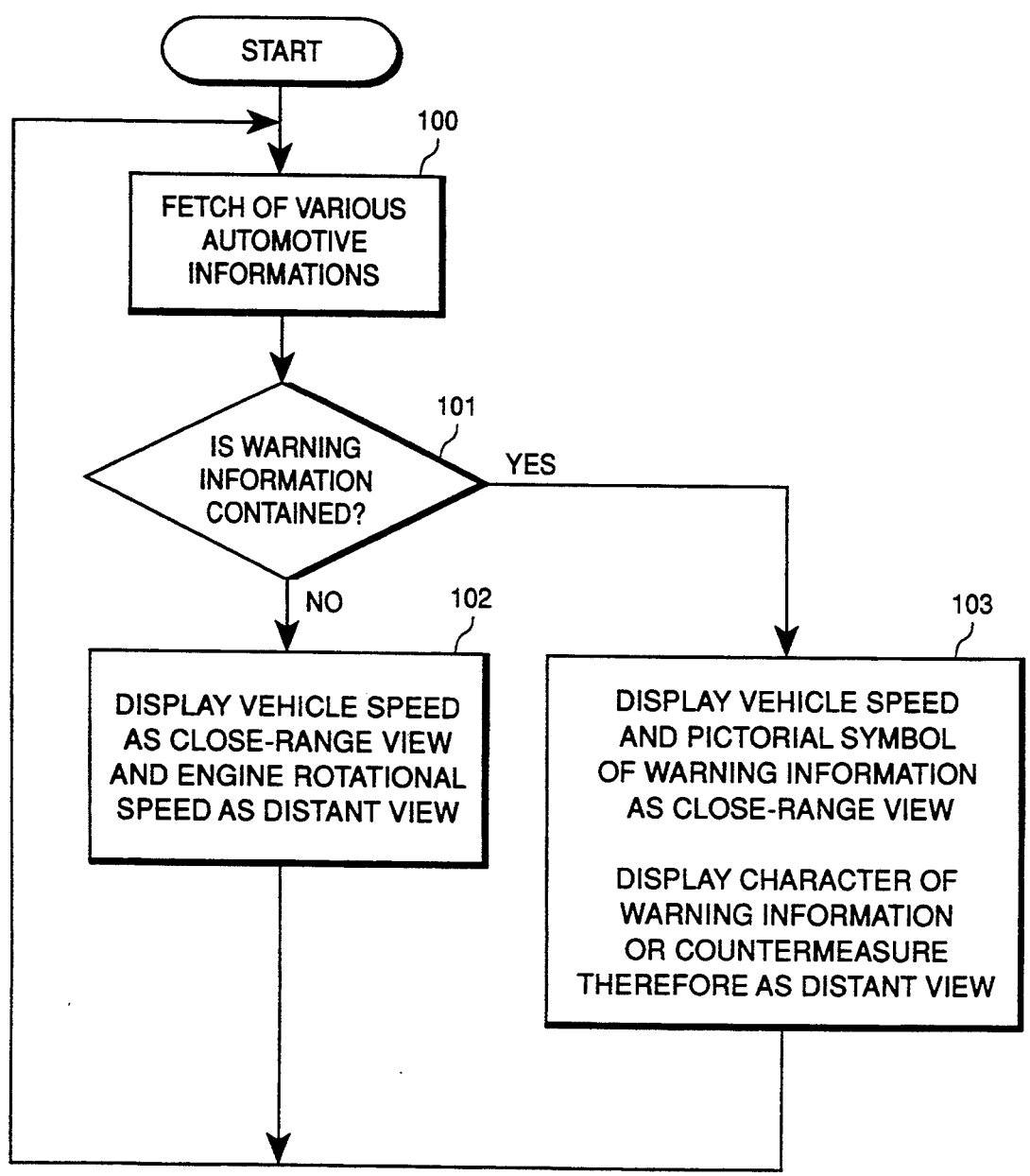
FIG. 3 is a flow chart showing an processing executed by a CPU in FIG. 2.
Figure 4:
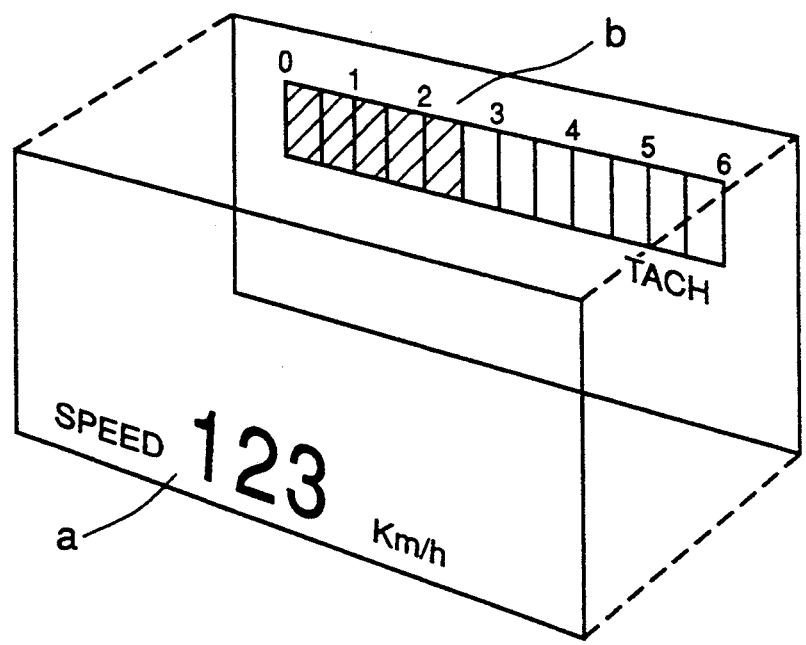
FIG. 4 is a perspective side view showing an example of a ordinary information displayed at the display apparatus in FIG. 1.

Operation of the automotive information display apparatus of the construction described above will be described with reference to a flow chart of FIG. 3. The flow chart illustrates an outline of processing to be executed by the CPU 12. After processing is started, fetching of various automotive information such as a vehicle speed, an engine rotational speed, a remaining amount of fuel, a distance to another vehicle and so forth as described above is executed first at step 100. Step 101 subsequently determines whether or not warning information which is necessary to be notified urgently to a driver is contained in the thus-fetched automotive information. If such warning information is not contained, then the control sequence advances to step 102, at which a digital display information a of a vehicle speed is provided as a close-range view and an analog display information b of an engine rotational speed is provided in the form of a bar graph as a distant view as shown in FIG. 4.

Figure 5A:
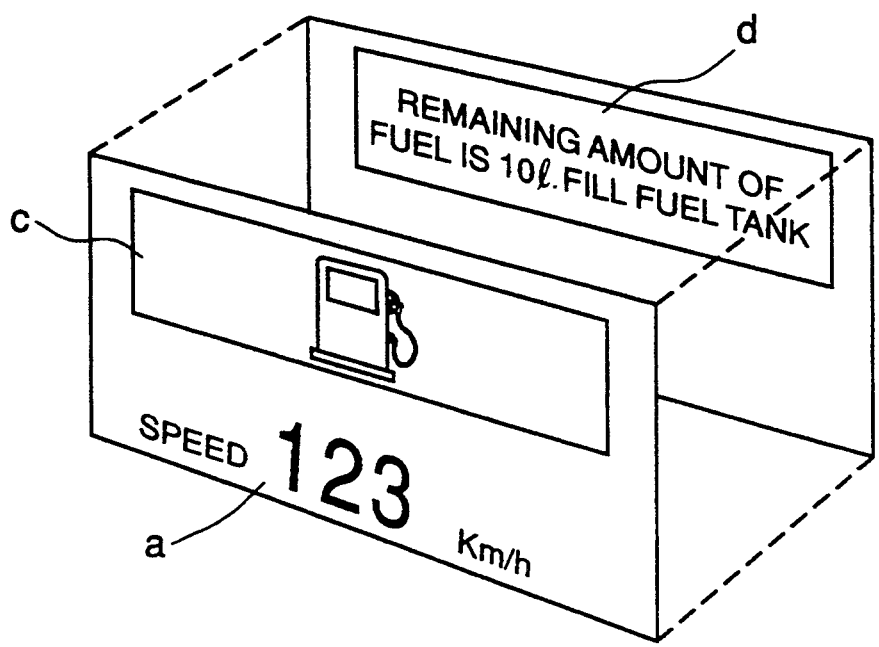
FIG. 5A is a perspective side view showing a first example of a warning information displayed at the display apparatus in FIG. 1.
Figure 5B:
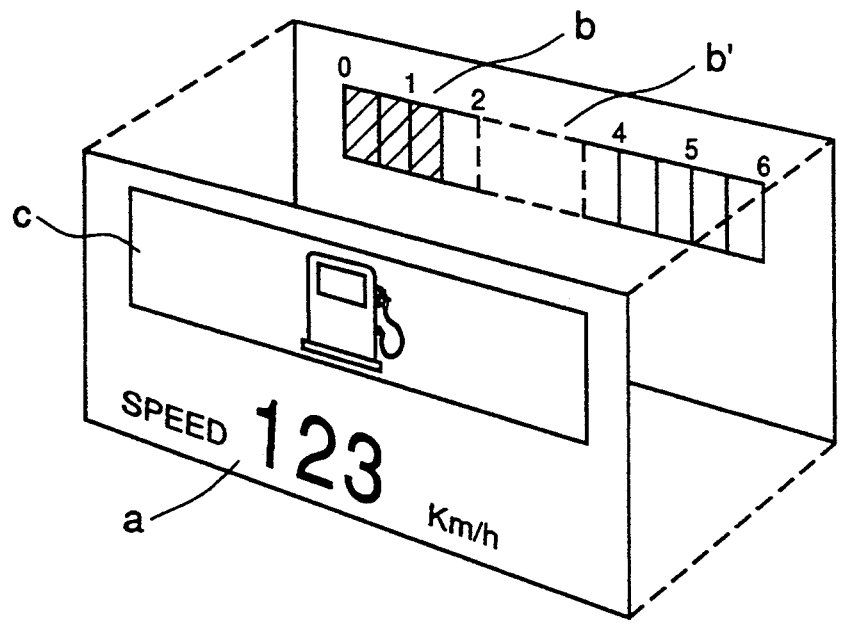
FIG. 5B is a perspective side view showing a second example of a warning information displayed at the display apparatus in FIG. 1.
Figure 5C:
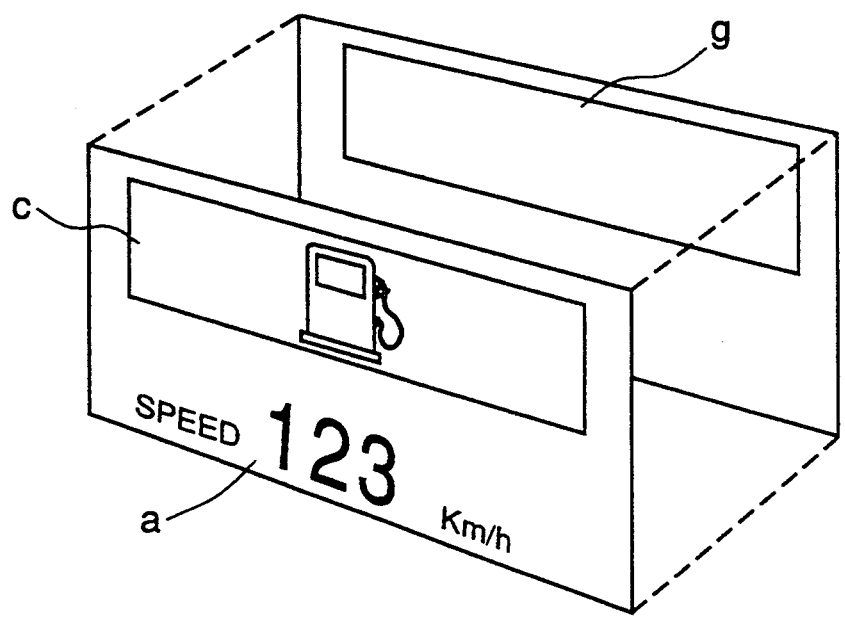
FIG. 5C is a perspective side view showing a third example of a warning information displayed at the display apparatus in FIG. 1.

If it is determined at step 101 that some warning information, for example, warning information which indicates a low fuel situation is contained in the information, then a digital display information a of a vehicle speed is provided as part of the close range view and a pictorial symbol c which straightforwardly represents contents of the warning information is provided at a position to overlap the bar graph in the line of direction of the driver's sight and such that the symbol is away from the bar graph by a predetermined distance above the digital display information a at step 103. Step 103 inhibits the ordinary information by changing the analog display information b of engine rotational speed of the distant view to character information d which represents contents of the warning information and/or a countermeasure for such warning information as shown in FIG. 5A. The analog display information b which is the ordinary information is inhibited from being displayed in FIG. 5A. It is also possible to alternately change over the pictorial symbol c of the close-range view and the character information d of the distant view at an interval of a fixed time intervals. When the warning information is displayed, a part b' of the ordinary information can be inhibited from being displayed as shown in FIG. 5B or all information displayed on a distant view display face g can be inhibited from being displayed as shown in FIG. 5C.

Since displays are provided using a pictorial symbol and character information corresponding to contents of the warning information, it becomes easy for a driver to notice such warning information. When the driver confirms and recognizes the warning information, the warning information display may be reset by a manual switch not shown. It is also possible to manually change over between a close-range view display and a distant view display by a manual switch to improve the visual observability of display information in accordance with each driver's individual eyesight characteristics.

A second embodiment of the present invention is shown in FIG. 6. The second embodiment is constituted such that the dot matrix display unit 21 is disposed substantially at a vertical orientation. A total reflection mirror 27 having a reflecting face inclined at 45 degrees is disposed in a corresponding relationship to a lower half portion of a front side of an information display face 22 of the dot matrix display unit 21, and a half mirror 26 inclined at 45 degrees is disposed above the total reflection mirror 27 such that it may correspond to an upper half portion of the information display face 22 of the dot matrix display unit 21. A louver 29 having a large number of light transmitting holes 28 formed in a vertical direction therein is disposed between the half mirror 26 and the total reflection mirror 27.

With the display apparatus of the construction described above, information displayed on the upper half portion of the information display face 22 of the dot matrix display unit 21 can be observed directly through the half mirror 26. Meanwhile, information displayed on the lower half portion of the information display face 22 cannot be observed directly because an eye from an oblique upper location is intercepted by a rear face of the total reflection mirror 27 and the louver 29, but it can be observed because it is reflected by the total reflection mirror 27 and then reflected by the half mirror 26. The optical path difference causes the display position of the information displayed on the lower half portion of the information display face 22 to be at a virtual image position as indicated by a broken line in FIG. 6. In this embodiment, an example of the ordinary information is shown in FIG. 7A By changing over the information display position on the information display face 22 of the dot matrix display unit 21 in this way the display position of information can be set to either of the two positions of a close-range view e and a distant view f. Further, it is also possible to simultaneously display the close-range view e and the distant view f as shown in FIG. 7B. Such changing over control of an information display position and display contents can be achieved by employing such driving circuit as described hereinabove in connection with the first embodiment and also operation of the same is similar to that of the first embodiment, and accordingly, detailed description thereof is omitted herein.

Figure 8A:
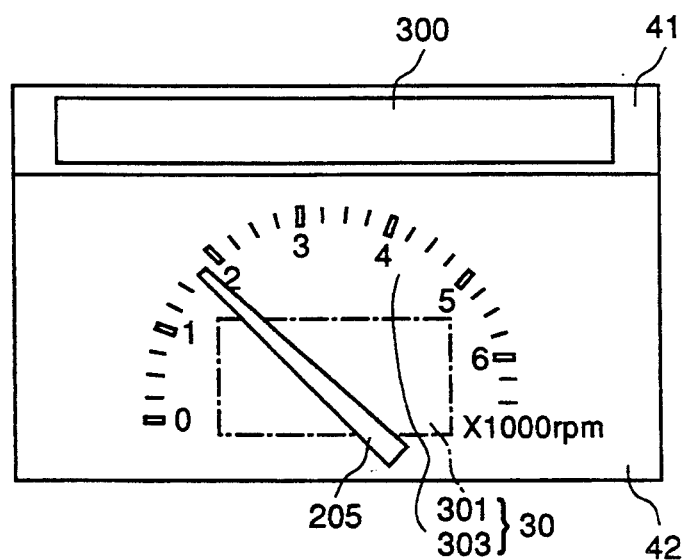
FIG. 8A is a front view of an information display apparatus showing a third embodiment of the present invention.
Figure 8B:
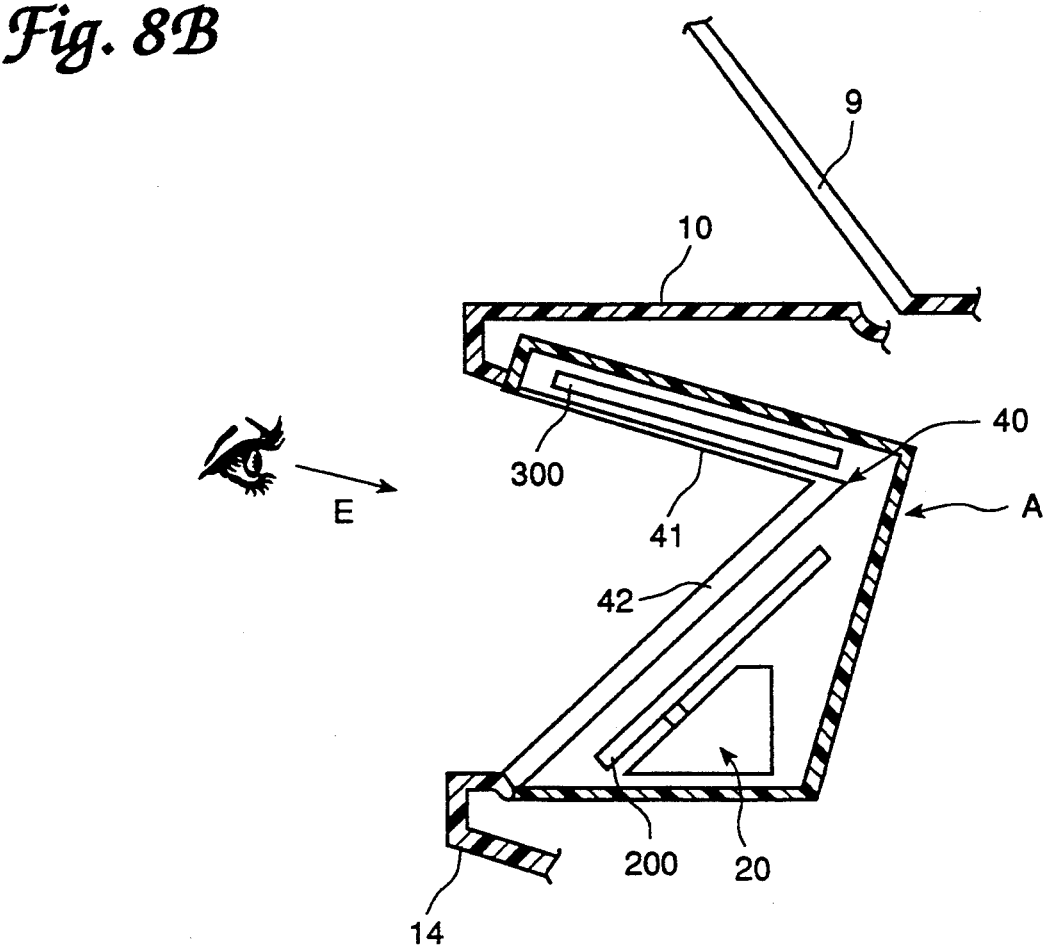
FIG. 8B is a partial cross sectional view of the information display apparatus in FIG. 8A.

FIGS. 8A and 8B show general construction of an automotive cluster apparatus which is a third embodiment of the present invention, where FIG. 8A is a front elevational view and FIG. 8B is a partial sectional view. The cluster apparatus A of this third embodiment is assembled in a hood 10 extending substantially horizontally from a lower edge of a windshield 9 of a vehicle toward a vehicle compartment and a dash board 14 constituting a front wall of the vehicle compartment.

Figure 10:
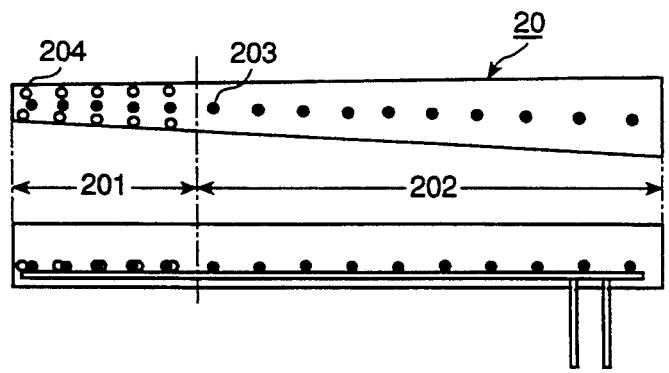
FIG. 10 shows a construction of a pointer of the third embodiment.

Reference numeral 20 denotes a mechanical analog display apparatus serving as a close-range view display, which is constituted such that a pointer 200 is turned in response to a speed of the vehicle, a speed of rotation of an engine or the like to indicate the speed of the vehicle, the speed of rotation of the engine or the like as well know. The pointer 20 is a light emitting pointer having light emitting elements such as LEDs, ELs or the like provided inside the pointer as shown in FIG. 10 and is constituted such that both of an end portion 201 and a major portion 202, that is, the entire pointer 200, emits light by a first light emitting element 203, but only the end portion 201 emits light by a second light emitting element 204.

Electronic display 300 is a liquid crystal display unit, a fluorescent character display tube or the like serving as a distant view display. The electronic display apparatus 300 is disposed in a predetermined spacing between the hood 10 and a first half mirror 41 assembled to a lower face of the hood 10. Display 300 has its information face directed downwardly and substantially horizontally. Thus first half mirror 41 is for attenuating the output of the dot matrix display 300. A second half mirror 42 is disposed in an intersecting relationship to a visually observing direction E. A light emitting portion of the pointer 200 is perceived as a real image 205 through the second half mirror 42 by a driver while a display of the digital display apparatus 300 passes through the half mirror 41 and is then reflected by the second half mirror 42 so that it is confirmed as a virtual image 30 by the driver. Accordingly, the driver will recognize the displays of the two display apparatus as a single combination display. The balance in brightness between the real image 205 and the virtual image 30 can be optimized by adjusting the reflection factor and transmission factor of the half mirrors 40.

Figure 9:
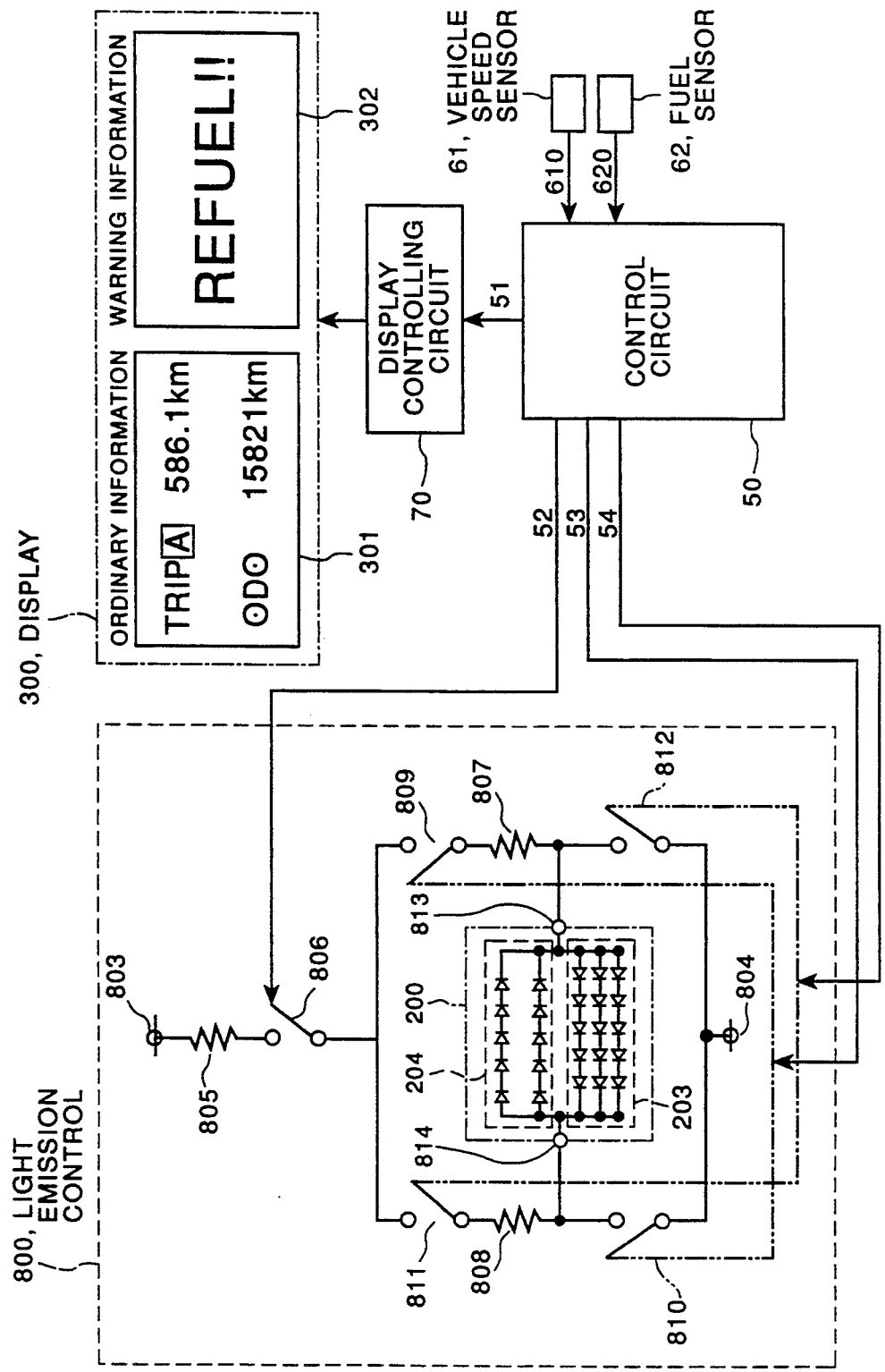
FIG. 9 is a electric circuit diagram showing the third embodiment.

Construction of an electric circuit of the cluster apparatus will be described with reference to FIG. 9.

Vehicle speed sensor 61, detects a speed of the vehicle and generates a vehicle speed detection signal 610. Fuel sensor 62 detects a remaining amount of fuel to be supplied to an engine and generates a remaining amount detection signal 620.

Control circuit 50 includes a microprocessor and calculates a vehicle speed and a remaining amount of fuel in response to a vehicle speed detection signal 610 from the vehicle speed sensor 61 and a remaining amount detection signal 62 from the fuel sensor 62, respectively, and generates results of the calculation as an output signal 51. A distance of travel can determined by the control circuit 50 by counting and accumulating a vehicle speed detection signal (pulse) 610 of the vehicle speed sensor 61.

Display controlling circuit 70 is formed constructed from an IC or the like, and controls the electronic display apparatus 300 to digitally display the results of calculation described above on a display face thereof in response to an output signal 51 from the control circuit 50. Reference numeral 301 denotes ordinary information such as a distance of travel of the vehicle or the like displayed on the display face of the electronic display apparatus 300, and 302 denotes warning information to urge a driver to supplement fuel or the like. Reference numeral 303 denotes a speed graduation, which is displayed normally. It is to be noted that, while the display of the speed graduations 303 is a virtual image display as shown in the figure, another construction may be employed wherein a graduation display apparatus (an LED or the like) is provided on the analog display apparatus 20 side to provide a real image display which passes through the half mirror.

Pointer light emission controlling circuit 800, whose construction will now be described. Pointer light emission controlling circuit 800 includes a first power source 803 which is used also as a power source for the control circuit and so forth described above and provides an output power of, for example, 10 [V]. Reference numeral 804 denotes a second power source, which provides a lower potential than the first power source, for example, −10 [V] so that the difference in potential between the first and second power sources may be 20 [V]. Here, the first power source 803 need not be used also as a power source for the control circuit and so forth, and in such instance, the first power source should provide 20 [V] while the second power source could then be replaced by ground connection.

Reference numerals 805, 807 and 808 denote first, second and third limiting resistors, respectively, which limit electric currents which flow through the first and second light emitting elements 203 and 204. Reference numeral 806 denotes a first switch means, and the first switch means 806 is ON-OFF controlled by a light emitting element driving signal 52 from the control circuit 5.

The first light emitting element 203 is constituted by 15 LEDs, wherein three sets of 5 LEDs connected in series are connected in parallel. The anode side of the series connection is connected to a first terminal 813 while the cathode side is connected to a second terminal 814. The second light emitting element 204 is constituted by 10 LEDs, formed of two sets of 5 series-connected LEDs that are connected in parallel. The second light emitting element 204 is reversed in polarity from the first light emitting element 203, and the cathode side is connected to the first terminal 813 while the anode side is connected to the second terminal 814.

A second switch means 809, the second limiting resistor 807 and a fifth switch means 812 connected in series and a fourth switch means 811, the third limiting resistor 808 and a third switch means 810 similarly connected in series are connected in parallel and connected between the first switch means 806 and the second power source 804.

The second and third switch means 809 and 810 are ON-OFF controlled simultaneously with each other by a first light emitting element driving signal 53 from the control circuit 50. Meanwhile, the fourth and fifth switch means 811 and 812 are ON-OFF controlled simultaneously with each other by a second light emitting element driving signal 54 from the control circuit 50. Here, the first light emitting driving signal 53 and the second light emitting element driving signal 54 are signals which are opposite in phase to each other.

The first terminal 813 is connected between the second limiting resistor 807 and the fifth switch means 812 while the second"d terminal 814 is connected between the third limiting resistor 808 and the second switch means 810. It is to be noted that a relay, a transistor or the like is employed for the first to fifth switch means described above.

The operation of the apparatus of the present invention having such construction as described above will be described with reference to the flow chart of FIG. 14.

The IG switch is turned on at step 400, then an attention information notation is displayed at step 402. An output signal of the control circuit 5 for this step will be described with reference to FIG. 13. If the IG switch is turned on, then the light emitting element driving signal 52 of the control circuit 50 outputs a Hi signal to switch on the first switch means 806, and simultaneously with this, also the second light emitting element driving signal 54 outputs a Hi signal to switch on the fourth and fifth switch means 811 and 812. Accordingly, an electric current from the first power source 803 flows into the second power source 804 through the first limiting resistor 805, first switching means 806, fourth switch means 811, third limiting resistor 808, second terminal 814, second light emitting element 204, first terminal 814 and fifth switch means 812 to light up the second light emitting element 204. Consequently, only the end portion of the pointer 20 emits light. Accordingly, a real image 205 only of the pointer end portion which has passed through the second half mirror 42 will be visually observed by a driver. Meanwhile, the control circuit 50 outputs an attention display signal to the display controlling circuit 70 so that the electronic display apparatus 300 displays an attention information. The attention information will be visually observed by the driver as a virtual image 30 which has passed through the first half mirror 41 and has been reflected by the second half mirror 42.

Figure 12A:
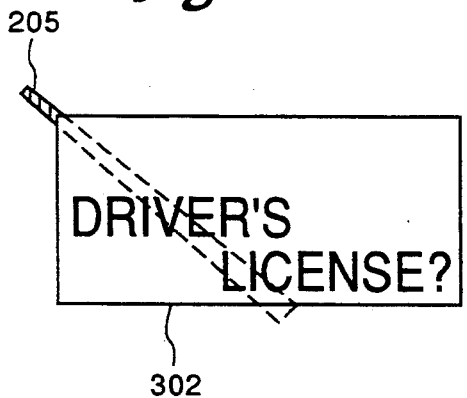
FIG. 12A is a front view showing an example of an attention information displayed at the display apparatus in FIG. 8A.

As a result, the display information that is visually observed by the driver will include superimposed display information of the two display apparatus as shown in FIG. 12A. A superimposed display information is a combination of the real image 205 and the virtual image 30 (shown in FIG. 8A). In this instance, at least the display area of the virtual image 30 is defined within an inhibition area where the real image 205 will not be visually observed because the light emitting diodes in this area will be off.

Figure 11A:
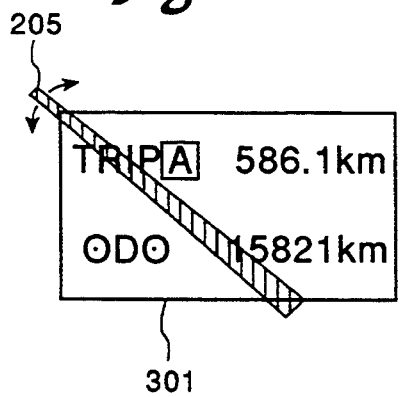
FIG. 11A is a front view showing an example of an ordinary information displayed at the display apparatus in FIG. 8A.

Subsequently, step 402 determines if the attention information has been displayed for a predetermined period of time, and if so it is determined at step 403 whether or not a warning information should be displayed. If not, then ordinary information is displayed at step 406. In this instance, the second light emitting element driving signal 54 of the control circuit 50 is changed into a Lo signal, so that the fourth and fifth switch means 811 and 812 are switched off, and simultaneously the first light emitting element driving signal 53 is changed into a Hi signal so that the second and third switch means 809 and 810 are switched on. Accordingly, an electric current from the first power source 803 flows into the second power source 804 through the first limiting resistor 805, first switch means 806, second switch means 809, second limiting resistor 807, first terminal 813, first light emitting element 203, second terminal 814 and third switch means 810 so that the first light emitting element 203 is lit, and accordingly, the entire pointer 200 emits light. This causes the real image 205 to be an image of the entire pointer 200. Meanwhile, the control circuit 50 outputs a travel distance display signal to the display controlling circuit 70 so that the electronic display apparatus makes a travel distance display as shown in FIG. 9. The trip display indicates a total travel distance of the vehicle from a point at which the driver arbitrarily returned it to zero. Accordingly, in the case of a normal display, a real image 205 and a virtual image 30 are displayed in an overlapping relationship on the second half mirror 41 as shown in FIG. 11A.

Figure 11B:
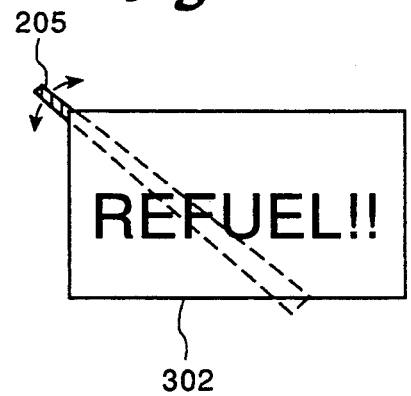
FIG. 11B is a front view showing an example of an warning information displayed at the display apparatus in FIG. 8A.

On the contrary if it is determined at step 403 that it is necessary to display a warning information, then the warning information will be displayed at step 404. For example, if it is detected by the fuel sensor 62 that the remaining amount of fuel is small, then a remaining amount detection signal 620 is inputted to the control circuit 50, and the digital display apparatus 300 is driven in response to such signal by the display controlling circuit 70. The driver therefore urgently receives this information of the digital display apparatus 300 to perform supplement of fuel. In this instance, the first and second light emitting element driving signals 53 and 54 of the control circuit 50 are in the same conditions as upon the attention display described hereinabove, and only the end of the pointer 200 emits light. Accordingly, the display condition of the cluster apparatus is changed to such a condition as shown in FIG. 11B. The warning information is displayed at the position where the warning information overlaps with the pointer which is the ordinary information in the line of direction of the driver's sight and that the warning information is away from the ordinary information. At the same time, a part of the light emitting display of the pointer 200 which is the overlap portion of the ordinary and warning information is inhibited. If it is determined at step 405 that a predetermined time has elapsed, then ordinary information is displayed at step 406 described above. Further, if it is judged at step 407 that a predetermined time has elapsed after such change into ordinary information, then it is judged at step 408 whether or not the vehicle is running, and if it is judged that the vehicle is running, then the control sequence returns to step 403. By repeating the control from step 403 to step 408 described above, when there is the necessity of displaying a warning information, the warning information and ordinary information are alternately displayed in a predetermined period as shown in a warning display section in FIG. 13.

After that, if the necessity of the warning information disappears, e.g. supplement of fuel is performed, then the display information is changed to display only ordinary information, and if the running is completed and it is detected at step 408 that the IG switch is turned off, then operation is stopped.

Figure 12B:
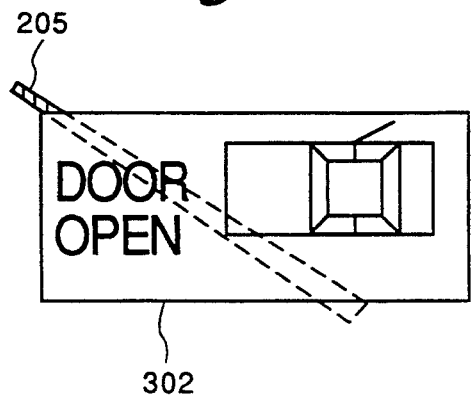
FIG. 12B is a front view showing another example of the warning information displayed at the display apparatus in FIG. 8A.

While ordinary information is described as a travel distance display above, there are, of course many other kinds of ordinary information, including time information, gear position information of an AT vehicle, digital vehicle speed information and so forth, and it should not be limited only to the travel distance information described above. Further, while warning information is described as being the attention information to perform a fuel supplement, there are other warning information, including an incompletely closed door information as shown in FIG. 12B and this also should not be limited to the fuel supplement information described above. When it is necessary to display, for example, a fuel supplement information and an incompletely closed door information at the same time, the two display conditions should be alternated at a period of a predetermined time, for example, 1 second.

As described above, in the embodiment of an automotive cluster apparatus of the present invention, when the entire display unit is observed, the construction thereof is different between when a ordinary information such as a travel distance information is being made by the electronic display apparatus and when a warning information such as a fuel supplement information is being made. Since the electronic display apparatus makes a warning information in such a manner that it interferes with a pointer display, such warning information is emphasized, and attention of the driver can be drawn with greater certainty.

What is claimed is:

1. An automotive displaying apparatus, comprising:
   displaying means for producing first information and for producing second information, said displaying means including a dot matrix display which is disposed with an information face thereof directed downwardly and horizontally;
   reflecting and transmitting means for displaying to an operator of the automotive vehicle said first information as a view from a close range and displaying said second information to the operator as a view from a distant range, said reflecting and transmitting means reflecting and transmitting said information of said information face so that said information is observed visually by said driver; and
   controlling means, connected to receive information from a plurality of sensors, for determining whether said information includes ordinary information and whether said information includes warning information, and for outputting signals to display said ordinary information and said warning information, when respectively present, on said displaying means;
   wherein said controlling means controls said displaying means such that: 1) said ordinary information is normally displayed at a first location in a line of the operator's sight, at a first range which is one of said close range and said distant range view displays, 2) when said warning information is determined, said warning information is displayed at said first location in a line of said driver's sight to overlap with said ordinary information at a second range, which second range is the other of said close range and distant range view displays than said first range and 3) said ordinary information at an overlap portion of said ordinary and warning information, where said ordinary and said warning information would overlap in the line of said operator's sight, is inhibited from being displayed but other ordinary information which does not overlap is not inhibited from being displayed,
   wherein said displaying means produces a first image and a second image, and said reflecting and transmitting means comprises a total reflection mirror in a position to totally reflect said first image as said distant range view and a half mirror located in a position to reflect said second image as a close range view and to pass said distant range view reflected by said total reflection mirror so that both of said views are combined.

2. An automotive display apparatus as set forth in claim 1, wherein said ordinary information includes a bar graph and said warning information includes a pictorial symbol.

3. An automotive display apparatus as set forth in claim 1, wherein said ordinary information is displayed at said distant range view display and said warning information is displayed at said close range view display.

4. An automotive display apparatus as set forth in claim 1, wherein said displaying means includes a dot matrix display which is disposed with an information face thereof directed to said driver and said reflecting and transmitting means reflects and transmits said information of said information face so that said information is observed visually by said driver.

5. An automotive displaying apparatus, comprising:
   displaying means for producing first information and for producing second information;
   reflecting and transmitting means for displaying to an operator of the automotive vehicle said first information as a view from a close range and displaying said second information to the operator as a view from a distant range; and
   controlling means, connected to receive information from a plurality of sensors, for determining whether said information includes ordinary information and whether said information includes warning information, and for outputting signals to display said ordinary information and said warning information on said displaying means;
   wherein said controlling means controls said displaying means such that: 1) said ordinary information is normally displayed at a first location in a line of the operator's sight, at a first range which is one of said close range and said distant range view displays, 2) when said warning information is determined, said warning information is displayed at said first location in a line of said driver's sight to overlap with said ordinary information at a second range, which second range is the other of said close range and distant range view displays than said first range and 3) said ordinary information at an overlap portion of said ordinary and warning information, where said ordinary and said warning information would overlap in the line of said operator's sight, is inhibited from being displayed but other ordinary information which does not overlap is not inhibited from being displayed, wherein said displaying means includes a light emitting pointer which is movable, and which allows a whole thereof, or a position thereof, to be lit, a position of said lighting emitting pointer indicating only said ordinary information when a whole length of said light emitting pointer is lit, and a digital display which displays said warning information and, when said warning information is displayed, only an end of said pointer and not the whole length of the pointer emits light and said warning information is displayed on said digital display at a position which overlaps a portion of said pointer which does not emit light.

6. An automotive display apparatus as set forth in claim 5, wherein said light emitting pointer is disposed behind a half mirror serving as said reflecting and transmitting means so that said pointer is observed visually through said half mirror by said driver while said digital display is disposed above said half mirror so that said warning information is reflected by said half mirror and is observed visually by said driver.

7. An automotive display apparatus, comprising:

a first display unit having a rotatable light emitting pointer whose position is moved to indicate ordinary information, said pointer being illuminated along its entire length when indicating ordinary information, and being illuminated only at its end and not along its entire length when indicating warning information;

a half mirror disposed in front of said first display unit such that a reflecting face thereof is inclined to a direction of an operator of the automotive vehicle's sight by a predetermined angle;

a second display unit disposed above said half mirror with an information displaying face thereof directed downwardly toward said half mirror for displaying warning information so that said operator can observe visually said warning information which is reflected by said half mirror, said warning information displayed at a position overlapping a part of said pointer which is not illuminated during display of warning information; and display control means for outputting a signal to said second display unit for displaying said warning information and a signal to said first display unit for controlling said light emitting pointer to light its entire length when no warning information is displayed and to light only part of said light emitting pointer when said warning information is displayed on said second display unit.

8. An automotive display apparatus as set forth in claim 7, wherein said display control means controls said second display unit such that said ordinary information is displayed on said second display unit when said warning information is not displayed on said second display unit.

9. An automotive display apparatus as set forth in claim 7, wherein said warning information displayed on said second display unit represents a condition that a remaining fuel amount is small and said ordinary information displayed by said first display unit is a vehicle speed.

10. An automotive displaying apparatus, comprising:

a display element, facing in a first direction, and driven to produce a first image in a first location thereof, and a second image in a second location thereof, said second location being closer to an observer than said first location;

a total reflection mirror, located in a position facing said first location of said display element to totally reflect said first image as a distant range view to an observer;

a half mirror located in a position between said total reflection mirror and said observer, and located in a position facing said second location of said display element to reflect said second image as a close range view to an observer and to pass said distant range view reflected by said total reflection mirror, so that said close range view and said distant range view are combined; and controlling means, connected to receive information from a plurality of sensors, for determining whether said information includes ordinary information and whether said information includes warning information, and for outputting signals to display said ordinary information and warning information on said displaying means, wherein said controlling means controls said display element such that: 1) said ordinary information is normally displayed at a first location in a line of the operator's sight, at a first range which is one of said close range and distant range view displays, 2) when said warning information is determined, said warning information is displayed at said first location in a line of said driver's sight to overlap with said ordinary information at a second range, which second range is the other of said close range and distant range view displays than said first range and 3) said ordinary information at an overlap portion of said ordinary and warning information, where said ordinary and said warning information would overlap in the line of said operator's sight, is inhibited from being displayed but other ordinary information which does not overlap is not inhibited.

11. An automotive display apparatus as set forth in claim 10, wherein said ordinary information includes a bar graph and said warning information includes a pictorial symbol.

12. An automotive display apparatus as set forth in claim 10, wherein said ordinary information is displayed at said distant range view display and said warning information is displayed at said close range view display.

13. An automotive display apparatus as set forth in claim 10, wherein said displaying means includes a dot matrix display which is disposed with an information face thereof directed to said driver and said reflecting and transmitting means reflects and transmits said information of said information face so that said information is observed visually by said driver.

* * * * *